United States Patent
Weihrauch

Patent Number: 6,163,918
Date of Patent: Dec. 26, 2000

[54] BRISTLES WITH SURFACE STRUCTURE, METHOD FOR THEIR MANUFACTURE AND INTERDENTAL CLEANER OR BRUSH MANUFACTURED THEREFROM

[75] Inventor: Georg Weihrauch, Wald-Michelbach, Germany

[73] Assignee: Pedex & Co. GmbH, Wald-Michelbach, Germany

[21] Appl. No.: 09/029,992

[22] PCT Filed: Aug. 22, 1996

[86] PCT No.: PCT/EP96/03690

§ 371 Date: Jun. 11, 1998

§ 102(e) Date: Jun. 11, 1998

[87] PCT Pub. No.: WO97/09906

PCT Pub. Date: Mar. 20, 1997

[30] Foreign Application Priority Data

Sep. 15, 1995 [DE] Germany .......................... 195 34 368

[51] Int. Cl.[7] .................................................. D02G 3/00
[52] U.S. Cl. .................... 15/207.2; 15/167.1; 15/DIG. 6; 264/167; 428/364; 428/400; 428/395
[58] Field of Search ............................. 15/DIG. 6, 167.1, 15/207.2, 187, 188; 264/167, 172.12, 177.13, 148, 210.8; 132/321, 329; 428/395, 375, 392, 396, 364, 373, 397, 400

[56] References Cited

U.S. PATENT DOCUMENTS

| | | |
|---|---|---|
| 3,522,342 | 7/1970 | Nungesser et al. . |
| 3,613,143 | 10/1971 | Muhler et al. . |
| 4,507,361 | 3/1985 | Twilley et al. . |
| 4,958,402 | 9/1990 | Weihrauch . |
| 5,679,067 | 10/1997 | Johnson et al. . |
| 5,722,106 | 3/1998 | Masterman et al. . |
| 5,735,011 | 4/1998 | Asher . |
| 5,837,179 | 11/1998 | Pihl et al. . |

FOREIGN PATENT DOCUMENTS

| | | |
|---|---|---|
| 2450580 | 3/1980 | France . |
| 161041 | 3/1974 | Hungary . |
| 172025 | 12/1978 | Hungary . |
| 214484 | 3/1980 | Hungary . |

*Primary Examiner*—Deborah Jones
*Assistant Examiner*—Jennifer McNeil
*Attorney, Agent, or Firm*—Antonelli, Terry, Stout & Kraus, LLP

[57] ABSTRACT

A method for the manufacture of surface-structured bristle material from plastic by extruding a monofilament. Before or during extrusion a granular material is admixed with a thermally melted first plastics material forming the main component of the monofilament. The granular material comprises a second plastics material, which has a higher thermal strength than the first plastics material. The particle size of the granular material is such that the monofilament, during a subsequent stretching, is subject to a greater transverse contraction in cross-sections where there is little or no granular material than in cross-sections containing granular material. A disclosed bristle included a surface structure from a first plastics material forming the main component of the bristle and in which is embedded in a substantially completely covered manner a granular material of a second plastics material, the granular material forming a structuring on the bristle surface. A brush, particularly a toothbrush or interdental cleaner, with a plurality of bristles, optionally combined into bundles and in which at least certain bristles have the aforementioned structure, is also disclosed.

23 Claims, 1 Drawing Sheet

BRISTLES WITH SURFACE STRUCTURE, METHOD FOR THEIR MANUFACTURE AND INTERDENTAL CLEANER OR BRUSH MANUFACTURED THEREFROM

TECHNICAL FIELD

The invention relates to bristles with a surface structure and to a method for the manufacture of surface-structured bristle material from plastic by extruding a monofilament. The invention also relates to a brush, particularly a toothbrush or interdental cleaner, which is at least partly provided with the surface-structured bristles.

Although the invention is described hereinafter in conjunction with bristles and bristle material, it expressly covers monofilaments, which can be processed to fabrics, mats, filters, etc. The invention can also be used in the case of paint brushes, polishing and abrading pads or cleaning, application, polishing or abrading devices.

BACKGROUND OF THE INVENTION

Plastic bristles which are extruded are normally smoothed on their surface due to the manufacturing process. In the case of brushware of a random nature, such bristles exercise their brushing action initially and mainly through the free ends of the bristles, which tear open the dirty surface and remove the dirt by scratching and scraping. In the case of stronger pressure, the bristles are bent round and act with their circumferential surface. They then slide in a stroking and sliding manner over the surface with a more gentle action. Also when applying paint and the like by means of a brush the bristles are curved or bent, so that they engage with the surface to be treated not only with their free bristle ends, but also with their circumferential surface. For a long time consideration has been given to using the circumferential surface of the bristles for surface treatment purposes by structuring or profiling it.

East German patent 32963 and U.S. Pat. No. 2,642,705 disclose the application of abrasive particles to the circumferential surface of bristles or a bristle material by embedding the same in the surface melted-on bristle material. Such a procedure is not only very complicated, but it has also been found that the external abrasive particles can become loose in particular due to the bending action occurring when using the bristles. In addition, such bristles are so abrasive and therefore aggressive, that it is not possible to use them in all cases of human dental and body care.

It is known from U.S. Pat. No. 2,642,705, British patent 1 327 329 and in particular DE-OS 20 37 674 to incorporate by mixing abrasive particles into the plastics material of the bristles. According to DE-OS 20 37 674 inorganic abrasive particles of aluminium oxide, chopped glass fibres, asbestos particles or ceramic material or also diamond particles are used, which have a much greater hardness than the surrounding plastics material, so that there is a very pronounced abrading action, which in many cases is undesired. Frequently the abrasive particles are incorporated in such a high percentage that they touch or penetrate to the bristle surface. Experience has also shown that such embedded abrasive particles over a period of time are exposed as a result of wear on the surface of the bristle, so that the abrasiveness of the bristles is significantly increased, so that such bristles cannot be used for human dental or body care, because it would lead to considerable risks of damage to the skin, teeth or mucous membranes of a user. In order to e.g. remove plaque from teeth or dirt from floors or roads, it is not so much a question of obtaining an abrading action by abrasive material, but instead a so-called reaming action, which could be achieved by a surface structure or topography. Through the mixing in of abrasive particles such a surface structure can only be obtained when using relatively large particles. Admittedly the reaming characteristics of such a bristle are adequate, but the large abrasive particles projecting over the surface simultaneously lead to high abrasiveness. The bristles are also greatly weakened by the incorporation of large abrasive particles, so that the bristles only have an inadequate strength.

It is also known to mechanically roughen the surface of bristles, in that the bristle flanks are structured with a tool (U.S. Pat. Nos. 3,325,845 and 3,229,347). The roughening of the bristle flanks can be brought about by means of an abrading or grinding device or also by sand blasting. However, this leads to the disadvantage that the longitudinally oriented molecules in the bristles are torn open and consequently the bristles are weakened. This procedure is also very complicated. After working the surfaces become fibrous and fringy, which leads to the risk of parts being released from the bristle material. It has been found that it is not possible in this way to obtain a clearly defined surface topography.

EP 360 938 A1 proposes embedding a blowing agent in the bristle material and to bring about a surface roughness by foaming the blowing agent. However, the chambers or cavities forming throughout the bristle strand lead to a significant bristle stiffness reduction. In addition, due to the torn open cavities the bristle surface is non-uniform and has no clearly defined structural depth or topography, which is necessary for effective reaming.

SUMMARY OF THE INVENTION

The problem solved by the invention is to provide a bristle or bristle material, which has a predetermined surface topography with a predetermined or only slight abrasiveness, but an increased reaming action. In addition, a method for the manufacture of the bristle material is to be provided with which corresponding bristles can be easily manufactured.

With regards to the method, a thermally melted first plastics material forming the main component of the extruded monofilament has a granular material of a second plastics material with a higher thermal strength than the first plastics material admixed with the latter before or during extrusion. When using a thermoplastic material as the second plastics material, the latter has a higher melting point. If, alternatively, another plastics material is used, it must be ensured that the latter does not liquefy or does not liquefy earlier than the first plastics material. The particle size of the granular material must be such that the monofilament during a subsequent drawing or stretching is located in cross-sections in which there is little or no granular material and is subject to a greater cross-sectional reduction or transverse contraction than in cross-sections with a large amount of granular material. The granular material does not serve as abrasive particles, but merely as a shape or resistance body in order to locally prevent transverse contraction.

In the method according to the invention the first plastics material, which can in known manner be polyamide, polyester, polyolefin, etc., is heated in an extruder and is consequently rendered flowable. Then, during or prior to extrusion the granular material from the second plastics material is admixed in a quantity of preferably 5 to 30% of the total weight of the bristle material. The dimensions of the granular material particles and their shape are dependent on the desired surface structure. The dimensions can fluctuate, but should not be too small. In a preferred development of the invention, the size of the granular material particles is between 10 and 50% of the diameter of the bristle material.

As the second plastics material of the granular material has a higher thermal strength or higher melting point than the first plastics material forming the main component, it can be achieved that as a result of the heat of the first plastics material it does not or only surface-melts, so that the granular material particles during extrusion are contained as solid inclusions in the flowable, first plastics material.

According to the invention the granular material is also formed by a plastics material. This leads to the advantage that the granular material can be produced in a simple manner, in that e.g. an extruded monofilament is produced and cut to length in the desired way. It has proved advantageous to choose the length of the granular material particle either identical to or longer than the monofilament diameter. However, alternatively, it is also possible to produce the granular material by grinding plastic. In order to obtain a relatively uniform particle size, the granular material can be sorted in the conventional manner by a screening process.

It has proved advantageous to deburr the granular material. Particularly in the case of granular materials produced by cutting to length a monofilament, relatively sharp edges occur, which could pass to the outside in the case of bristle wear. These sharp edges are removed by the deburring process, which can take place thermally and/or mechanically. In the case of thermal deburring, the granular material undergoes surface premelting, so that the sharp edges flow. It is alternatively possible to surface-work in drums said granular material prior to admixing with the first plastics material and consequently the edges are removed.

It has been found that for the granular material it is possible to also use higher thermally stable plastics which, as a result of their molecular structure, could not hitherto be used for bristle manufacture, because the technical values of the inventively manufactured bristle material are only dependent to a limited extent on the nature of the granular material.

If the first plastics material with admixed granular material is forced through the die of the extruder and the monofilament delivered is drawn off at a speed which is higher than the delivery speed from the die, a first stretching of the monofilament takes place. However, the tensile forces only act in the first plastics material, because the granular material particles are contained in substantially freely mobile manner therein. As a result of the stretching the coiled molecules of the first plastics material are longitudinally oriented and the diameter of the monofilament is reduced by transverse contraction. The diameter reduction does not take place in uniform manner over the length, but instead the granular material particles impeded transverse contraction, so that in the vicinity of a granular material particle there is a lower cross-sectional reduction than in areas where there are no granular material particles. Therefore the stretching leads to a surface structure of the monofilament.

The still flowable monofilament with surface structure is subsequently cooled in known manner, which leads to a solidification. The monofilament is preferably subsequently exposed to a further stretching, which leads to an elongation to a much greater length and in particular to a further diameter reduction. The longitudinally oriented molecules of the first plastics material are not destroyed. This can be followed in conventional manner by a stabilization of the monofilament or the bristle material.

If, according to a further development of the invention, the abrasiveness of the second plastics material of the granular material is at the most of the same level as that of the first plastics material, it is reliably prevented that the abrasiveness of the bristle material is dependent on whether and optionally to what extent granular material particles are located on the circumferential surface of the monofilament or exert their action. Even if the bristle flank or circumferential surface is worn over a period of time and consequently the granular material particles touch the circumferential surface, at the most the bristle has the same abrasiveness as the first plastics material forming the main component.

According to a preferred development of the invention, the granular material is embedded in the first plastics material and is substantially completely covered by the latter. This is brought about in that the granular material is so wetted by the first plastics material in the extruder, that on passing out through the die it is largely covered by the plastics material. Therefore the monofilament has a circumferential surface, which is substantially completely formed by the first plastics material.

It has been found that the surface topography brought about by the zonally differing transverse contraction is dependent on the shape of the granular material particles and is in accordance therewith. For obtaining different topographies, the granular material can be spherical, parallelepipedic or prismatic or can contain a mixture of particles with different shapes.

As has already been stated, the granular material need not melt during the extrusion process, so that the particles form a solid, dimensionally stable inclusion in the first plastics material. It is alternatively also possible for surface melting to take place during extrusion of the granular material formed from plastic, so that it forms a solid bond and is surface welded to the surrounding first plastics material. However, it must be ensured that the granular material does not completely melt, because it would otherwise mix with the first plastics material. However, the surface melting can bring about a deburring.

For the first and second plastics materials, use is preferably made of thermoplastic material combinations which can be readily welded together. Particularly in the case of toothbrushes, it has proved appropriate to combine with the first plastics material of the bristles, Nylon 6.12, a polyphenylene sulphide granular material. The melting point difference between Nylon 6.12 (218° C.) and polyphenylene sulphide (260° C.) has proved particularly advantageous.

Both the first and second plastics materials of the granular material may or may not be filled with fillers.

It has been found that the surface structuring is best visible if relatively little granular material is admixed with the first plastics material. However, this leads to a decrease in the abrasiveness due to the small number of surface protuberances. In this case abrasiveness can be increased again by adding fillers to the first plastics material. This makes it possible to obtain a slightly abrasively filled bristle with a good surface structure.

It can be advantageous in certain applications for the granular material to be harder than the first plastics material. In this case the formation of the surface structure is advantageously supported and maintained in a lasting manner. However, alternatively, it is also possible for the granular material to be softer than the first plastics material. This leads to a more flexible surface structure, which is particularly appropriate in means for the treatment of sensitive areas, e.g. the gums or interdental spaces. For this purpose it is possible for the granular material to comprise a rubberlike material.

For certain applications it must be ensured that a user is able to recognize as such the reaming action-providing bristles according to the invention and does not use the same by mistake. According to the invention this can be achieved in that the first plastics material is made transparent or translucent. Therefore the user can detect the covered granular material, which preferably has a different colour to the first plastics material, through the latter. For the visualizing of any shape, size and action-differing granular material types, they can be embedded in different colours in the transparent or translucent first plastics material.

With regards to the bristle the aforementioned set problem is solved in that the bristle is made from a first plastics material forming the main component in which is embedded a granular material of a second plastics material in a substantially completely covered manner, the granular material forming a structuring on the bristle surface. The abrasiveness of the second plastics material of the granular material can correspond at the most to that of the first plastics material. With such bristles the desired massaging and cleaning effects are not determined by the filler or the granular material, but by the surface structures of the bristles resulting from the granular material dimensioning. Further features and advantages of corresponding bristles can be gathered from the above description of the method. The aforementioned features and advantages can also occur in a monofilament, such as is e.g. used in certain interdental cleaners.

The bristles or monofilament can have a random cross-sectional shape, in particular round, oval, triangular, square, star-shaped, etc.

The invention also relates to a brush, particularly a toothbrush or interdental cleaner, having a plurality of bristles optionally combined into bundles and in which at least some of the bristles are designed according to the invention. In order to adapt the action of a brush to given framework conditions, the bristles according to the invention can also be combined and processed together with bristles having other configurations. Interdental cleaners are also known, which only comprise a single monofilament. The invention is also intended to cover those interdental cleaners in which the monofilament is designed according to the invention.

Apart from the aforementioned brushes, the invention can also be used in paintbrushes for obtaining a better paint retention capacity, in hairbrushes for a good cleaning and degreasing capacity, in massaging brushes with a better rubbing action, in manually and machine-operated brooms for increased dirt absorption, in polishing and abrading pads with a higher efficiency as a result of surface topography, as well as in woven, braided or other mats, cleaning equipment, applicators, polishing and abrading devices manufactured from bristles or monofilaments. The invention can also be implemented in a filter which, due to its structuring, has an enlarged monofilament surface.

BRIEF DESCRIPTION OF THE DRAWINGS

The invention is described in greater detail hereinafter relative to an embodiment and the attached FIGS. 1 to 3, wherein show.

DETAILED DESCRIPTION

Figure 2:
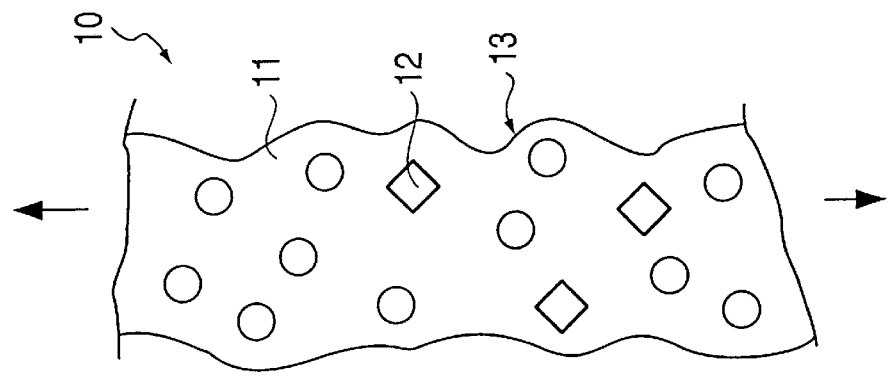
FIG. 2 The monofilament following prestretching.
Figure 1:
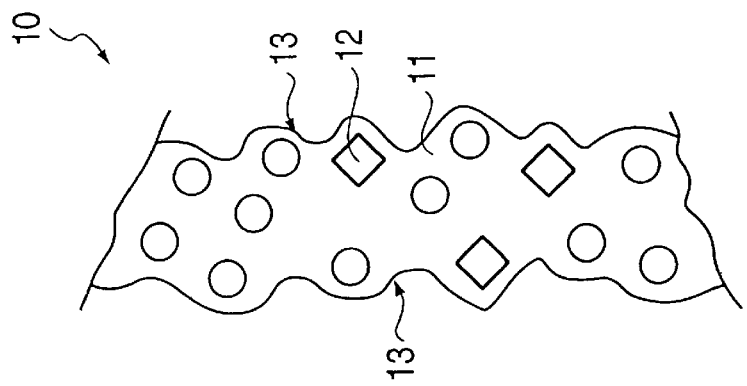
FIG. 1 A monofilament after extrusion in longitudinal section.

As can be seen in FIG. 1, immediately after passing out of the extruder die, a monofilament 10 has a substantially uniform cross-section over its length with a smooth circumferential surface 13, several granular material particles 12 of a second plastics material are embedded in irregular manner in a first plastics material 11 forming the main component of the monofilament 10. In this embodiment the granular material particles 12 in part have a spherical shape and in part a parallelepipedic shape. The first plastics material 11 is flowable, whereas the granular material particles 12 form solid, stable inclusions. After passing out of the extruder die (cf. arrows in FIG. 1) the monofilament is prestretched, so that it is subject to a cross-sectional reduction due to transverse contraction. However, the granular material particles 12 zonally prevent this transverse contraction, so that cross-sections, where there is little or no granular material particle or particles, are subject to a stronger transverse contraction than those cross-sections in which there are relatively few granular material particles. This leads to a non-uniform, varying cross-sectional shape and size over the length of the monofilament, so that on the outside of the circumferential surface 13 is formed a structuring, as can be seen in FIG. 2.

Figure 3:
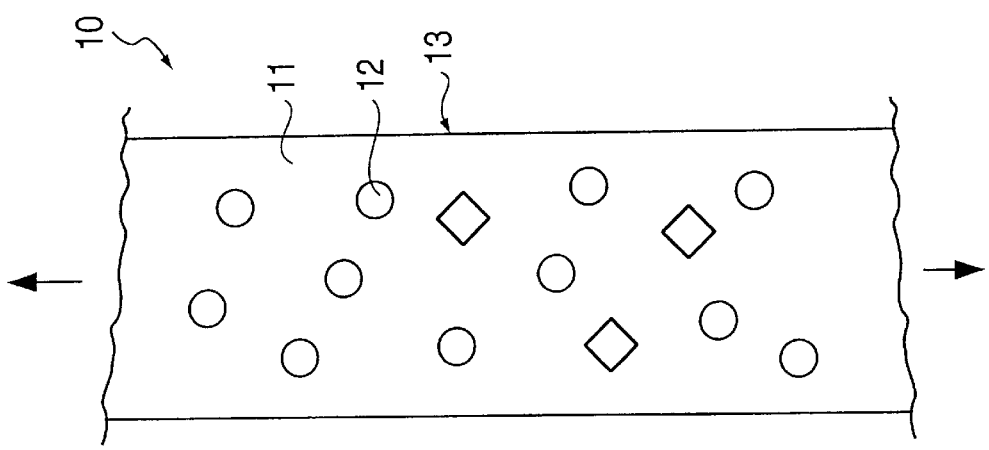
FIG. 3 The monofilament after further stretching.

After cooling the monofilament is stretched again (cf. arrows in FIG. 2) and elongated to several times its previous length. This leads to a further cross-sectional reduction due to transverse contraction, which is once again prevented by the granular material particles. FIG. 3 shows the resulting increased structuring of the circumferential surface 13 of the monofilament 10. It can be seen that the surface topography formed is dependent on the shape of the granular material particles. When using spherical granular materials more gentle topography shapes are formed than when using e.g. parallelepipedic granular materials.

What is claimed is:

1. Method for the manufacture of surface-structured bristle material from plastic comprising the steps of extruding a monofilament, in which with a thermally melted first thermoplastic material forming the main component of the monofilament is admixed, before or during extrusion, a granular material of a second thermoplastic material the abrasiveness of which is at most the same as that of the first thermoplastic material, which has a higher thermal strength than that of the first thermoplastic material, wherein the granular material is surface-welded to the surrounding first thermoplastic material during said extruding, and stretching the monofilament, wherein the particle size of the granular material is such that during said stretching, in cross-sections where there is little or no granular material, the monofilament is subject to a greater transverse contraction than in cross-sections with a large amount of granular material to structure the outside of the circumferential surface of the monofilament with a non-uniform, varying cross-sectional shape and size.

2. Method according to claim 1, wherein after said stretching, the monofilament is cooled, then further stretched and stabilized.

3. Method according to claim 1, wherein the granular material is admixed in a quantity of 5 to 30% of the total weight of the bristle material.

4. Method according to claim 1, wherein the size of the granular material particles is between 10 to 50% of the diameter of the bristle material.

5. Method according to claim 1, wherein the granular material is embedded in the first thermoplastic material and is substantially completely covered by the latter.

6. Method according to claim 1, wherein the granular material comprises spherical and/or prismatic particles.

7. Method according to claim 1, wherein the granular material is produced by cutting to length from an extruded mono-filament.

8. Method according to claim 1, wherein the granular material is produced by grinding plastic.

9. Method according to claim 1, wherein the granular material is deburred.

10. Method according to claim 9, wherein deburring takes place thermally and/or mechanically.

11. Method according to claim 1, wherein the second thermoplastic material of the granular material is harder than the first thermoplastic material.

12. Method according to claim 1, wherein the second thermoplastic material of the granular material is softer than the first thermoplastic material.

13. Method according to claim 1, wherein the first thermoplastic material is transparent or translucent.

14. Method according to claim 1, wherein the first thermoplastic material and/or the second thermoplastic material is filled with fillers.

15. Bristle with a surface structure, said bristle comprising as a main component a first thermoplastic material, and embedded in said first thermoplastic material in a substantially completely covered manner a granular material of a second thermoplastic material, the abrasiveness of which is at most the same as that of the first thermoplastic material, said granular material being surface-welded to the surrounding first thermoplastic material, the granular material forming a structuring on the surface of the bristle such that the outside circumferential surface of the bristle is non-uniform, varying in cross-sectional shape and size, and wherein the abrasiveness of said second thermoplastic material of the granular material is at most the same as that of the first thermoplastic material.

16. Bristle according to claim 15, wherein the granular material is admixed in a quantity of 5 to 30% of the total weight of the bristle.

17. Bristle according to claim 15, wherein the size of the granular material is between 10 and 50% of the bristle diameter.

18. Bristle according to claim 15, wherein the granular material comprises spherical and/or prismatic particles.

19. Bristle according to claim 15, wherein the second thermoplastic material of the granular material is harder than the first thermoplastic material.

20. Bristle according to claim 15, wherein the second thermoplastic material of the granular material is softer than the first thermoplastic material.

21. Bristle according to claim 15, wherein the first thermoplastic material is transparent or translucent.

22. Brush, particularly toothbrush or interdental cleaner, with a plurality of bristles optionally combined into bundles, wherein at least some of said bristles comprise as a main component a first thermoplastic material, and embedded in said first thermoplastic material in a substantially completely covered manner a granular material of a second thermoplastic material the abrasiveness of which is at most the same as that of the first thermoplastic material, said granular material being surface-welded to the surrounding first thermoplastic material, the granular material forming a structuring on the surface of the bristle such that the outside circumferential surface of the bristle is non-uniform, varying in cross-sectional shape and size.

23. Interdental cleaner comprising a single bristle, said bristle comprising as a main component a first thermoplastic material, and embedded in said first thermoplastic material in a substantially completely covered manner a granular material of a second thermoplastic material, said granular material being surface-welded to the surrounding first thermoplastic material, the granular material forming a structuring on the surface of the bristle such that the outside circumferential surface of the bristle is non-uniform, varying in cross-sectional shape and size, and wherein the abrasiveness of said second thermoplastic material of the granular material is at most the same as that of the first thermoplastic material.

* * * * *